United States Patent [19]

Blair

[11] 4,175,615
[45] Nov. 27, 1979

[54] PIPE HEADER-CYLINDRICAL TANK JOINT AND METHOD OF JOINING SAME

[75] Inventor: Lloyd S. Blair, Hickory, N.C.

[73] Assignee: General Electric Company, Philadelphia, Pa.

[21] Appl. No.: 870,916

[22] Filed: Jan. 19, 1978

[51] Int. Cl.² .................. F28F 9/18; B23K 31/02; F16L 41/08
[52] U.S. Cl. ............................ 165/106; 228/170; 285/22; 285/189; 29/157 T; 29/157.4
[58] Field of Search ................... 228/170, 173 F; 29/157 T, 157.4; 285/22, 189, 286; 165/106

[56] References Cited

U.S. PATENT DOCUMENTS

| 972,119 | 10/1910 | McKibben | 285/189 |
| 2,192,904 | 3/1940 | Ferris | 228/173 F |
| 3,180,663 | 4/1965 | Lehmann | 285/189 |

Primary Examiner—Francis S. Husar
Assistant Examiner—Kenneth J. Ramsey
Attorney, Agent, or Firm—William Freedman; Carl L. Silverman

[57] ABSTRACT

A tubular pipe header is provided with an end surface which is substantially flat and in orthogonal relation to the longitudinal axis of the pipe header. An arcuate surface of a cylindrical transformer tank is provided with an aperture having a configuration at least a portion of which closely matches a portion of the end surface of the pipe header such that the matching end surface of the pipe header can be moved into the aperture when alignment therebetween is obtained. Another portion of the aperture includes non-matching means which prevents another portion of the end surface of the pipe header from moving into the aperture when alignment is obtained. In one embodiment, the non-matching means comprises tabs located in the same arcuate surface as the aperture. The tabs extend into the aperture. In aligning, the end surface of the pipe header is aligned with the aperture. The aligning step includes moving the matching end surface of the pipe header into the aperture and engaging the other portion of the end surface of the pipe header with the non-matching means of the aperture. Upon alignment, the pipe header is welded to the cylindrical tank.

12 Claims, 6 Drawing Figures

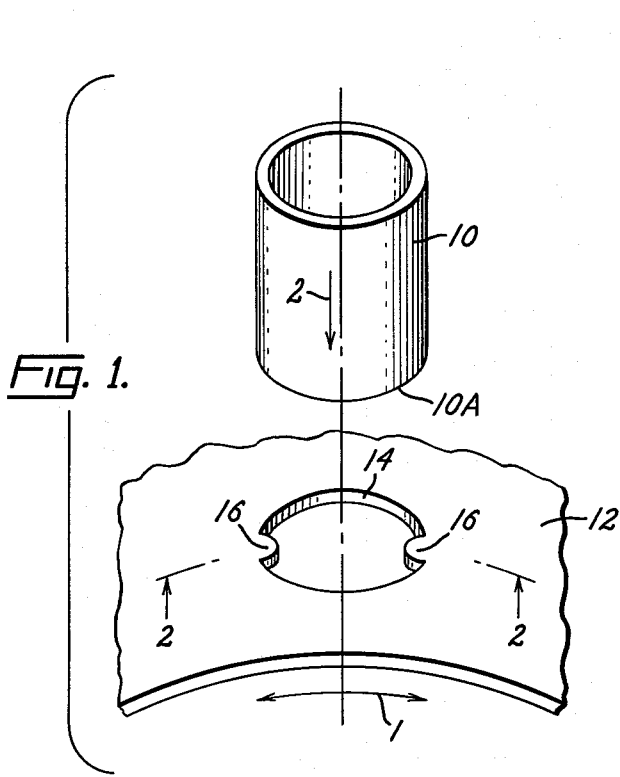
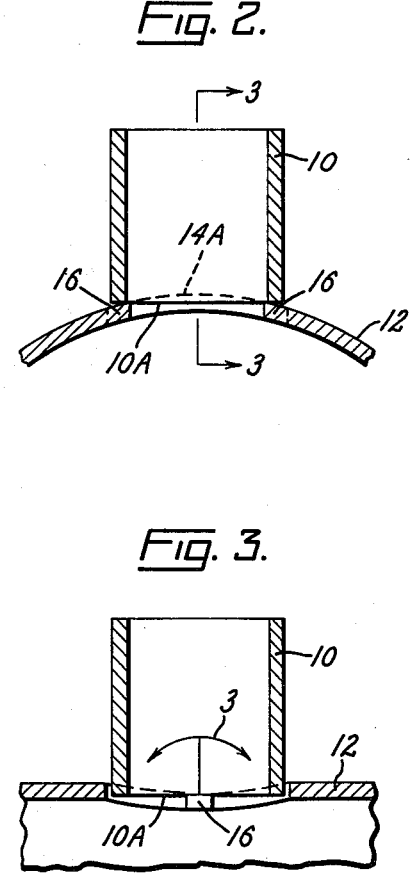
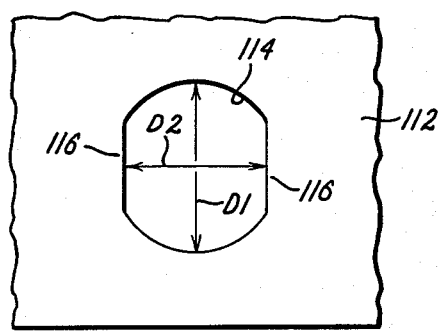
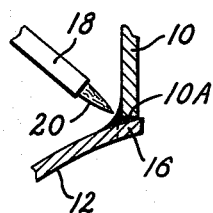
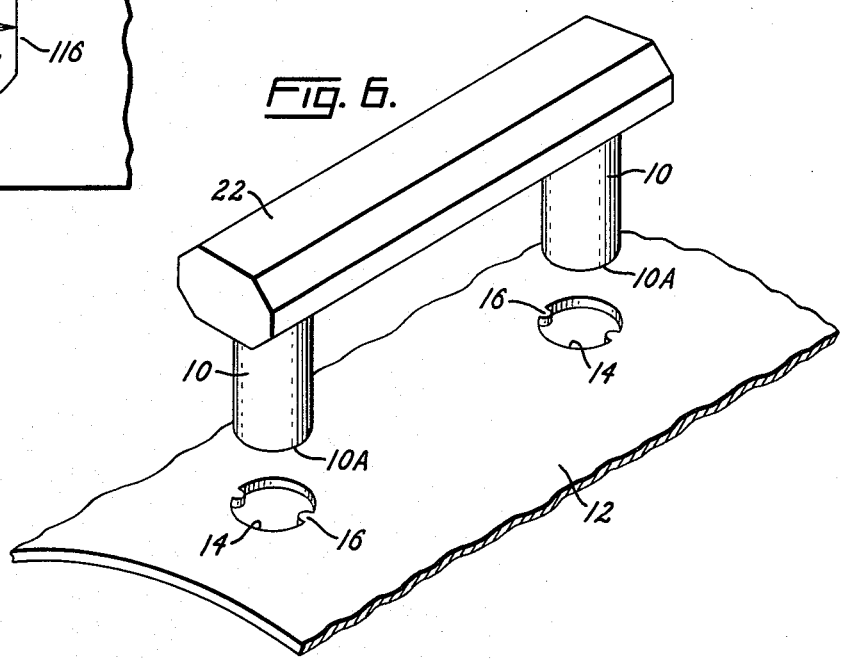

PIPE HEADER-CYLINDRICAL TANK JOINT AND METHOD OF JOINING SAME

BACKGROUND OF THE INVENTION

This invention relates to a method of joining a tubular member to an arcuate surface, and more particularly to such a method in which a pipe header is joined to a cylindrical transformer tank with the use of a minimum number of fixtures.

In the electrical field, it is often necessary to join a tubular member, such as a pipe header, to an arcuate surface, such as the surface of a cylindrical transformer tank. For such applications, it is desirable to provide a good joint through a method which requires a minimum number of fixtures. Generally, a particular requirement for such a joint is that the pipe header should extend only a prescribed distance into the transformer tank in order to provide adequate electrical clearances.

Although such joints can be provided through well known welding techniques, such techniques exhibit several disadvantages. One such disadvantage is that it is difficult to properly align the flat end surface of the pipe header against the arcuate surface of the cylindrical transformer tank. Generally, proper alignment requires the use of additional fixtures for obtaining the proper alignment and then holding the proper alignment during the joining of the header to the cylindrical transformer tank. One approach has been to provide the arcuate surface of the cylindrical transformer tank with an aperture through which the end portion of the pipe header can be inserted. However, this approach does not allow complete alignment of the pipe header in relation to the transformer tank in that there is no means to maintain the header within the prescribed distance into the tank. The above-mentioned problems are amplified when it is necessary to join a pair of such headers to the cylindrical transformer tank.

Therefore, it is a general object of my invention to provide a method of joining a tubular member to an arcuate surface in which the method requires the minimum use of additional fixtures.

Another object of my invention is to provide such a method for use in joining a pair of spaced pipe headers, which are in fixed relation to each other, to an arcuate surface of a cylindrical transformer tank.

SUMMARY OF THE INVENTION

In carrying out one form of the method of the present invention, I provide a tubular member with an end surface which is substantially flat. I provide an arcuate surface with an aperture. The aperture is of a configuration which closely matches at least a portion of the end surface of the tubular member and related in dimension thereto such that the matching portion of the end surface of the tubular member can be moved into the aperture when the end surface and the aperture are in aligned relation. Another portion of the aperture includes non-matching means of a configuration which prevents another portion of the end surface from moving into the aperture when the end surface and the aperture are in aligned relation. The method includes an aligning step wherein the matching portion of the end surface is moved into the aperture and the other portion of the end surface is engaged with the non-matching means of the aperture. Upon alignment, the method includes joining the tubular member to the arcuate surface.

BRIEF DESCRIPTION OF THE DRAWING

My invention will be more fully understood and its several objects and advantages further appreciated by referring now to the following description, taken in conjunction with the accompanying drawings, wherein:

FIG. 1 is an exploded perspective view showing a pipe header and arcuate portion of a cylindrical transformer tank prior to aligning and joining the two members in accordance with one form of the method of the present invention.

FIG. 2 is a partially broken away sectional view, taken along line 2—2 of FIG. 1, showing the mechanism by which the aligning step of the method of the present invention may be obtained.

FIG. 3 is a partially broken away sectional view, taken along line 3—3 of FIG. 2, showing another mechanism by which the aligning step of the method of the present invention may be obtained.

FIG. 4 is a sectional view, taken as in FIG. 2, showing a welding technique suitable for use in one form of the method of the present invention.

FIG. 5 is a plan view showing a portion of a modified arcuate surface portion suitable for use in the method of the present invention.

FIG. 6 is an exploded perspective view, taken as in FIG. 1, showing another form of the method of the present invention in which a pair of pipe headers is aligned to a transformer tank.

DETAILED DESCRIPTION OF THE INVENTION

Referring initially to FIG. 1, a pipe header 10 is shown prior to engaging an arcuate surface portion 12 of a cylindrical transformer tank (entire tank not shown). Typically, the cylindrical transformer tank is of a metal, such as steel or stainless steel, and has a curvature shown by the curved arrow 1. Typically, the cylindrical tank has a diameter of 17.5" to 21". The pipe header 10 is of a metal, such as steel, or stainless steel, and has a substantially flat end surface 10A which is generally circular in cross section. Generally, the end surface 10A is substantially orthogonal to the longitudinal axis of the pipe header 10. Typically, the outside diameter of the pipe header 10 is about 3.000 inches. The arcuate surface 12 includes an aperture 14 for receiving the end surface 10A of the pipe header 10. The aperture 14 closely matches the configuration of the end surface 10A of the header 10. The aperture 14 is generally circular in configuration but slightly larger than the cross section of the pipe header 10, e.g., the aperture 14 has an inside diameter of about 3.062 inches. The aperture 14 includes non-matching means 16 which may comprise two opposing tabs (also designated 16) which extend into the aperture 14 a sufficient distance so as to prevent the pipe header 10 from moving into and through the aperture 14 in the direction of the arrow 2. In the exemplary embodiment shown in FIG. 1, the opposing tabs 16 lie in the same curved surface as the arcuate surface 12. The tabs 16 are disposed such that, when the flat end surface 10A is placed thereon, as viewed from the flat end surface 10A, the tabs 16 are recessed with respect to the surrounding curved surface 12 which defines the aperture 14.

Referring now to FIGS. 1 and 2, one form of the method of the present invention will be discussed. The arcuate surface 12 is disposed such that the surface to be joined to the pipe header 10, i.e., that portion surrounding, and hence, defining the aperture 14, is facing generally upward. The surface 10A of the pipe header 10 is disposed on the top of the surface 12 and in approximate coaxial alignment with the aperture 14. The pipe header 10 is then moved along the surface 12 until proper alignment is obtained. Depending upon the size of the members, the pipe header 10 may be moved in sliding fashion, or, in non-sliding fashion. Proper alignment generally is defined as a situation in which the pipe header 10 and aperture 14 are substantially coaxial. In such a situation, the longitudinal axis of the pipe header 10 is in substantial alignment with a line passing through the center of the aperture 14.

During the above aligning step, the recessed tabs 16 prevent the pipe header 10 from extending beyond the prescribed distance into the tank. In addition, the recessed tabs 16 are in the same curved surface as the arcuate surface 12 so that, once this aligning position is obtained, the pipe header 10 is held in place by the remaining curved portions of the arcuate surface 12 which surround and define the aperture 14. More particularly, referring now to FIG. 2, with a portion of the end surface 10A engaging the recessed tabs 16 during the aligning step, the remaining curved portion 14A of the arcuate surface 12 holds, or "locks," another portion of the end surface of the pipe header 10 in this aligned position. Although only one such "locking" mechanism is shown in FIG. 2, it is to be appreciated that a similar mechanism is provided on the opposing side, these mechanisms combining to "lock" the pipe header 10 in the aligned position. As a result of the above locking mechanism a minimum number of fixtures is required to obtain and hold this aligned position. It is important to note that this aligned position is obtained without the pipe header 10 extending more than a predetermined distance into the tank, see FIGS. 2 and 3. Generally, this predetermined distance will be established by the dimensions of the members to be joined, especially the curvature defining the aperture.

Referring now to FIG. 3, it is to be appreciated that once the surface 10A of the pipe header 10 has engaged the tabs 16 and coaxial alignment is obtained, a position is reached in which the tabs 16 function as a pivot axis about which the pipe header 10 can be pivoted, as shown by the arrow 3 in FIG. 3. It is to be appreciated that this pivot operation is obtained only when substantial coaxial alignment is present. This pivot operation at the aligned position allows the operator, if desired, to conveniently obtain various joining angles between the pipe header 10 and the arcuate surface 12. For example, one such joining angle may comprise the situation shown in FIGS. 1 and 2 in which the longitudinal axis of the pipe header 10 is in substantially orthogonal relation to the longitudinal axis of the arcuate surface portion 12, i.e., the pipe header 10 is radial with respect to the arcuate surface portion 12.

Upon completing the aligning step, the pipe header 10 is joined to the arcuate surface 12 through any conventional joining technique. For example, in the illustrative application, welding is typically employed. As shown in FIG. 4, the welding technique may include employing a welding rod 18 to provide a welding filet 20 at the interface between the end surface 10A and the arcuate surface 12.

It is to be noted that, in the illustrated positioning of the pipe header 10 and arcuate surface 12, at least a component of gravity provides some support for maintaining the desired aligned position. This generally obviates the need for additional fixtures, especially support fixtures. Note also that the support provided by the tabs 16 during the aligning and joining step means that considerably less effort is required of the operator.

In FIG. 5, a modified arcuate surface portion 112 of a cylindrical transformer tank is shown. The arcuate surface 112 includes an aperture 114 which is intended to be employed with the pipe header 10 of FIGS. 1–3. The aperture 114 is generally circular in configuration and closely matches the configuration of the end surface 10A of the pipe header 10. For example, in this situation, the aperture 114 is generally circular in configuration and slightly larger than the cross section of the pipe header 10, e.g., an inside diameter of about 3.062 inches. The aperture 114 includes non-matching means 116 which may comprise two opposing portions (also designated 116) of the aperture 114 which depart from the generally circular configuration of the aperture and have a substantially linear configuration. In the illustrative situation, the generally circular cross section of the aperture 114 has a diameter D1 of 3.062 inches while the "diameter" D2 of the opposing linear portions 116 is 2.750 inches. Due to this configuration, the opposing linear portions 116 prevent the pipe header 10 from passing through the aperture 114 beyond the prescribed distance into the tank.

In applying the method of the present invention to the structure of FIG. 4, it can be observed that the opposing linear portions 116 function in a manner similar to the tabs 16 of FIGS. 1-3. That is, the linear portions 116 are recessed with respect to the surrounding curved surface 112 which defines the aperture 114. Hence, the opposing linear portions 116 prevent the pipe header 10 from extending beyond the prescribed distance into the tank. Also, the recessed linear portions 116, when engaged by the end surface 10A of the pipe header 10, permit the "locking" mechanism to be effected by the surrounding curved surface 112 which defines the aperture 114. One advantage of the linear portions 116 however, is that such configurations may be more simply obtained through conventional die processing techniques.

Referring now to FIG. 6, another form of the present invention will be discussed. In this Figure, the method of the present invention is shown in connection with joining a pair of spaced pipe headers 10 to an arcuate surface portion 12 of a cylindrical transformer tank (entire tank note shown). The spaced pipe headers 10 are generally parallel to each other. One end of each pipe header 10 is fixed at an end portion of a radiator unit 22. Such a combination is known in the art as a means to cool a transformer. In such a combination, a cooling medium is communicated through one of the pipes (inlet) into the radiator unit 24, out of the radiator unit 24 through the other pipe header 10 (outlet) into the transformer tank, and then out of the transformer tank through the inlet pipe header 10. The radiator unit 22 may include a stack of the structure shown in FIG. 5 with the stack still including the spaced pipe headers.

The end surfaces 10A of the spaced pipe headers 10 of FIG. 6 are substantially coplanar to each other. In this form of the method of the present invention, the arcuate surface portion 12 is provided with a second aperture 14 located a distance from the first aperture 14 which corresponds to the distance between the end surfaces 10A of the two spaced pipe headers 10. Thus, the aligning step here is completed when both sets of pipe headers 10 and apertures 14 are aligned. This can be accomplished substantially simultaneously. As discussed earlier in connection with FIGS. 1–3, alignment is obtained without the pipe headers extending into the tank beyond the prescribed distance. Indeed, as previously described, the slight distance that the end portion of the pipe headers extend into the aperture 14 allows alignment to be more simply obtained. This is due to the locking mechanism earlier discussed. It should be noted that, in the method employed in connection with FIG. 6, substantially no pivoting operation is available as the end portions of the pipe headers to be joined are disposed in fixed relation to each other. This, however, is preferable for this application as it ensures that both pipe headers 10 are disposed in the desired radial relation with respect to the cylindrical transformer tank.

Although as hereinbefore described, two opposing tabs or linear portions have been employed in the method of the present invention, it is apparent that, depending upon the relative dimensions and degree of curvature of the arcuate surface, more than two such tabs or linear portions may be provided. Similarly, although the use of tabs or linear portions has been discussed hereinbefore, other non-matching means may be substituted therefor. Indeed, the non-matching means of the aperture may comprise a combination of various suitable structures.

Further, although the method of the present invention has been described hereinbefore in connection with pipe headers and cylindrical transformer tanks, it is to be appreciated that the present invention is generally applicable to situations in which an end portion of a tubular member is to be aligned with and joined to an arcuate surface.

While I have illustrated preferred embodiments of my invention, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A method of joining an end portion of a first tubular member to an arcuate surface, comprising the steps of:
    (a) providing said end portion with an end surface which is substantially flat;
    (b) providing a first aperture in said arcuate surface, said aperture having a configuration which closely matches at least a portion of said end surface of said tubular member and being related in dimension thereto such that said end portion of said tubular member adjacent to said matching end surface can be moved into said aperture when said end surface and said aperture are in aligned relation, another portion of said aperture including non-matching means of a configuration which prevents an end portion adjacent to another portion of said end surface from moving into said aperture when said end surface and said aperture are in aligned relation, said non-matching means comprising at least two tabs projecting inwardly from said aperture, said tabs being recessed with respect to the surrounding portion of said arcuate surface which defines said aperture, said two tabs being disposed in substantially opposed relation around said aperture, said tabs being effective when engaged by said end surface of said end portion to prevent movement of said end portion into said aperture;
    (c) aligning said end surface of said end portion with said aperture, the aligning step including moving said matching portion of said end surface into said aperture and engaging said other portion of said end surface with said non-matching means of said aperture until said end portion is in a pivotal position in said aperture, said aperture configuration providing sufficient clearance to said end portion so that said end portion is transversely pivotable with respect to said arcuate surface; and
    (d) joining said end portion to said arcuate surface.

2. A method in accordance with claim 1 in which the step of aligning includes moving said end surface of said end portion along said arcuate surface until said end portion is in said pivotal position in said aperture.

3. A method in accordance with claim 1 in which the step of aligning includes moving said end surface of said end portion along said arcuate surface until said end portion is in a locking position in said aperture wherein said end portion adjacent to said matching end surface is at least partially surrounded by a portion of said arcuate surface which defines said aperture.

4. A method in accordance with claim 3 in which said tubular member comprises a metal pipe header of generally circular cross-section, said arcuate surface comprises a portion of a surface of a substantially cylindrical metal tank and said aperture is generally of circular configuration, wherein the joining step comprises welding said end portion of said pipe header to said cylindrical tank.

5. A method in accordance with claim 4 in which said end surface of said pipe header is substantially orthogonal to the longitudinal axis of said pipe header and in which the step of aligning comprises causing said longitudinal axis of said pipe to be substantially orthogonal to the longitudinal axis of said cylindrical tank.

6. A method in accordance with claim 5 which includes the step of disposing said cylindrical tank in a fixed position such that said aperture is in a position facing upward and then disposing said end surface of said pipe header on said aperture, the longitudinal axis of said pipe header being in a generally vertical position wherein at least a component of gravity provides some support for maintaining the desired position for the aligning step.

7. A method of joining an end portion of a first tubular member of a relatively small diameter to an arcuate surface of a member having a relatively large diameter, comprising the steps of:
    (a) providing said end portion with an end surface which is substantially flat;
    (b) providing a first aperture in said arcuate surface, said aperture having a generally circular configuration which closely matches at least a portion of said end surface of said tubular member and being related in dimension thereto such that said end portion of said tubular member adjacent to said matching end surface can be moved into said aperture when said end surface and said aperture are in aligned relation, another portion of said aperture including non-matching means of a configuration which prevents an end portion adjacent to another portion of said end surface from moving into said aperture when said end surface and said aperture are in aligned relation, said non-matching means comprising at least two portions of said aperture which depart from said circular configuration by having a linear configuration, said two portions being recessed with respect to the surrounding portion of said arcuate surface which defines said aperture, said two linear portions being disposed in substantially opposed relation around said aperture, said two portions being effective when engaged by said end surface of said end portion to prevent movement of said end portion into said aperture;

(c) aligning said end surface of said end portion with said aperture, the aligning step including moving said matching portion of said end surface into said aperture and engaging said other portion of said end surface with said non-matching means of said aperture; and (d) joining said end portion to said arcuate surface.

8. A method in accordance with claim 7 in which the step of aligning includes moving said end surface of said end portion along said arcuate surface until said end portion is in a locking position in said aperture wherein said end portion adjacent to said matching end surface is at least partially surrounded by a portion of said arcuate surface which defines said aperture.

9. A method in accordance with claim 8 in which said tubular member comprises a metal pipe header of generally circular cross-section and said arcuate surface comprises a portion of a surface of a substantially cylindrical metal tank wherein the joining step comprises welding said end portion of said pipe header to said cylindrical tank.

10. A method in accordance with claim 9 in which said end surface of said pipe header is substantially orthogonal to the longitudinal axis of said pipe header and in which the step of aligning comprises causing said longitudinal axis of said pipe to be substantially orthogonal to the longitudinal axis of said cylindrical tank.

11. A method in accordance with claim 10 which includes:

(a) providing a radiator unit, an opposing end portion of said pipe header being fixed thereto and a second pipe header being fixed thereto in spaced generally parallel relation to said pipe header, said second pipe header having an end surface which is substantially coplanar with said end surface of said pipe header;

(b) providing said arcuate surface with a second aperture which is spaced from said aperture, said second aperture being spatially related to said second pipe header as said aperture is related to said pipe header; and (c) wherein the step of aligning comprises respectively aligning said end surfaces of said pipe header and said second pipe header with said aperture and said second aperture.

12. A cylindrical tank with a pair of said generally parallel pipe headers joined thereto through the method of claim 11, each of said pipe headers joining said cylindrical tank to said radiator unit.

* * * * *